(12) United States Patent
Kobayashi

(10) Patent No.: US 12,675,559 B2
(45) Date of Patent: Jul. 7, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Yujiro Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,075

(22) Filed: Mar. 25, 2023

(65) Prior Publication Data

US 2024/0054192 A1     Feb. 15, 2024

(30) Foreign Application Priority Data

Aug. 10, 2022     (JP) ................................. 2022-128364

(51) Int. Cl.
*G06F 21/31*         (2013.01)

(52) U.S. Cl.
CPC ...... *G06F 21/31* (2013.01); *G06F 2221/2141* (2013.01); *G06F 2221/2145* (2013.01)

(58) Field of Classification Search
CPC ............. G06F 21/31; G06F 2221/2141; G06F 2221/2145; G06F 21/44; G06F 21/45
See application file for complete search history.

(56) References Cited

U.S. PATENT DOCUMENTS

| | | | | |
|---|---|---|---|---|
| 8,365,245 B2 * | 1/2013 | Childress | ................ | G06F 21/31 |
| | | | | 5/17 |
| 8,631,478 B2 * | 1/2014 | Chen | ................... | H04L 63/0281 |
| | | | | 726/8 |
| 8,875,261 B2 * | 10/2014 | Delia | ...................... | H04L 63/20 |
| | | | | 726/6 |
| 8,973,108 B1 * | 3/2015 | Roth | ....................... | G06F 21/00 |
| | | | | 726/28 |
| 9,652,604 B1 * | 5/2017 | Johansson | ............. | H04W 4/021 |
| 9,699,173 B1 * | 7/2017 | Roth | ....................... | G06F 21/45 |
| 10,049,202 B1 * | 8/2018 | Johansson | ............. | G06F 3/0486 |
| 11,032,287 B1 * | 6/2021 | Wang | ..................... | H04L 63/20 |
| 11,277,532 B2 | 3/2022 | Ohtake et al. | | |
| 2008/0066167 A1 * | 3/2008 | Andri | ..................... | G06F 21/31 |
| | | | | 726/5 |
| 2009/0006856 A1 * | 1/2009 | Abraham | ................ | G06F 21/55 |
| | | | | 713/183 |
| 2014/0164776 A1 * | 6/2014 | Hook | .................. | G06F 21/6218 |
| | | | | 713/171 |
| 2018/0227286 A1 * | 8/2018 | Ohsumi | ................. | H04L 63/08 |
| 2018/0253544 A1 * | 9/2018 | Ohsumi | ............. | H04L 63/0884 |
| 2021/0075926 A1 * | 3/2021 | Ohtake | ............. | H04N 1/00411 |
| 2023/0409997 A1 * | 12/2023 | Yin | ............... | G06Q 10/063112 |

FOREIGN PATENT DOCUMENTS

| | | |
|---|---|---|
| JP | 2021041495 | 3/2021 |
| JP | 2021043625 | 3/2021 |

* cited by examiner

*Primary Examiner* — James R Turchen
(74) *Attorney, Agent, or Firm* — JCIPRNET

(57)         ABSTRACT

An information processing apparatus includes a processor configured to provide plural authentication units for one account for logging into a device, permit login by the one account even using any of the plural of authentication units, and assign authority of the one account to each of the authentication units.

12 Claims, 3 Drawing Sheets

| SETTING | SETTING VALUE |
|---|---|
| ACCOUNT NAME | 11111 |
| USER PASSWORD | ***** |
| USER NAME | UserA |
| ORGANIZATION | Dev |
| AGENT NAME | AgentA |
| AGENT PASSWORD | **** |
| PROXY AUTHORITY | PRINT, BACKUP, RESTORE |
| PROXY DEADLINE | 03/31/2022 |

```
              ( START )
                 |
S101  | PROVIDE PLURALITY
      | OF PASSWORDS FOR ONE ACCOUNT |
                 |
S102  | ASSIGN AUTHORITY TO PROVIDE
      | ANOTHER PASSWORD FOR ONE PASSWORD |
                 |
S103  | ASSIGN AUTHORITY OF ONE ACCOUNT
      | FOR EACH PASSWORD |
                 |
              ( END )
```

| SETTING | SETTING VALUE |
|---|---|
| ACCOUNT NAME | 11111 |
| USER PASSWORD | ***** |
| USER NAME | UserA |
| ORGANIZATION | Dev |
| AGENT NAME | AgentA |
| AGENT PASSWORD | **** |
| PROXY AUTHORITY | PRINT, BACKUP, RESTORE |
| PROXY DEADLINE | 03/31/2022 |

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2022-128364 filed Aug. 10, 2022.

BACKGROUND

(i) Technical Field

The present invention relates to an information processing apparatus, a non-transitory computer readable medium storing an information processing program, and an information processing method.

(ii) Related Art

There is a technique for controlling a proxy operation.

JP2021-043625A discloses an information processing apparatus including a memory and a processor, in which the processor is configured to control to display on an operation screen of the first user that an operation by a first user cannot be accepted in a case where the first user who has an operation authority for a certain device requests a second user to act on behalf of the device and the first user tries to operate the device.

SUMMARY

In a case where a second user acts on behalf of an operation of a device by a first user, there is a way of creating a new account using a user identifier that identifies the second user.

However, there is a problem in that management of accounts becomes complicated in a case where the number of accounts increases.

Aspects of non-limiting embodiments of the present disclosure relate to an information processing apparatus that enables an agent who is a second user to operate a device without creating a new account, a non-transitory computer readable medium storing an information processing program, and an information processing method.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to provide a plurality of authentication units for one account for logging into a device, permit login by the one account even using any of the plurality of authentication units, and assign authority of the one account to each of the authentication units.

BRIEF DESCRIPTION OF THE DRAWINGS

Exemplary embodiment(s) of the present invention will be described in detail based on the following figures, wherein.

DETAILED DESCRIPTION

Figure 1:
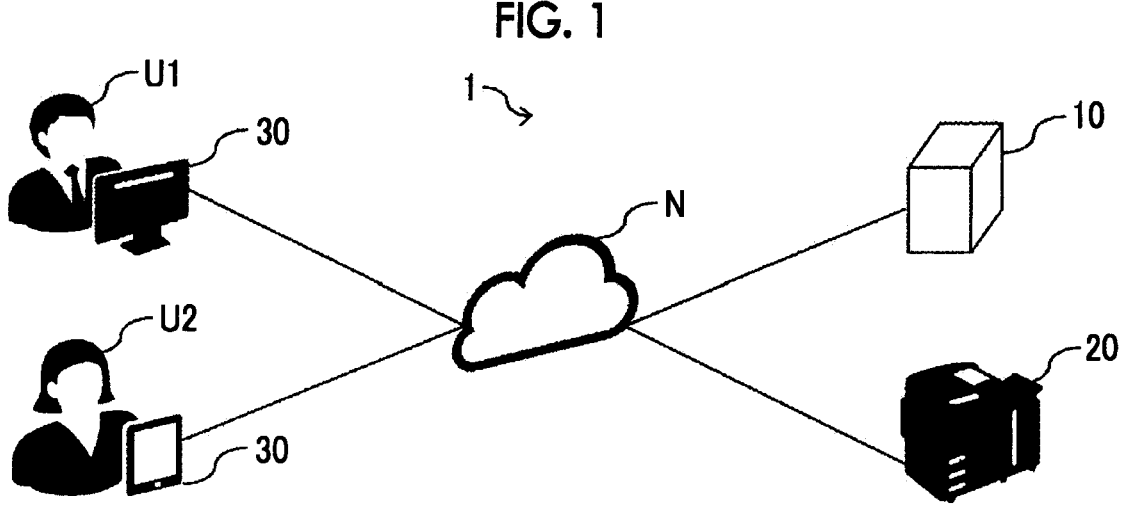
FIG. 1 is a schematic configuration diagram of an information processing system.

Hereinafter, an example of an exemplary embodiment of a technique of the present invention will be described with reference to the drawings. In each drawing, identical or equivalent components and parts are assigned by the identical reference numerals. In addition, a dimensional ratio in the drawing is exaggerated for convenience of description and may differ from an actual ratio.

FIG. 1 is a schematic configuration diagram of an information processing system 1 of the present disclosure. The information processing system 1 includes an information processing apparatus 10, an image forming apparatus 20, and a terminal apparatus 30.

The information processing apparatus 10 is an apparatus that controls a proxy operation. The information processing apparatus 10 is, for example, a server. The information processing apparatus 10 can communicate with the image forming apparatus 20 and the terminal apparatus 30 via a network N. The information processing apparatus 10 receives a login request from the terminal apparatus 30 to the image forming apparatus 20 and executes an authentication process. Then, the information processing apparatus 10 transmits the permission or rejection of the login or the permission or rejection of an operation of the terminal apparatus 30 to the image forming apparatus 20 according to an authentication result.

The image forming apparatus 20 is an apparatus that forms an image on a recording medium, such as paper, based on a print job. The image forming apparatus 20 is an apparatus that has a login function. The image forming apparatus 20 receives the permission or rejection of the login or the permission or rejection of the operation from the information processing apparatus 10. The image forming apparatus 20 may be any apparatus which has the login function, and is not limited to the image forming apparatus. In the present disclosure, the image forming apparatus 20 may be referred to as a device.

The terminal apparatus 30 is an apparatus that requests login and operation with respect to the image forming apparatus 20. The terminal apparatus 30 receives an operation of a requester U1 requesting a proxy operation or an agent U2 requesting the proxy operation. The proxy operation is, for example, execution of printing, execution of backup, or execution of restoration.

Figure 2:
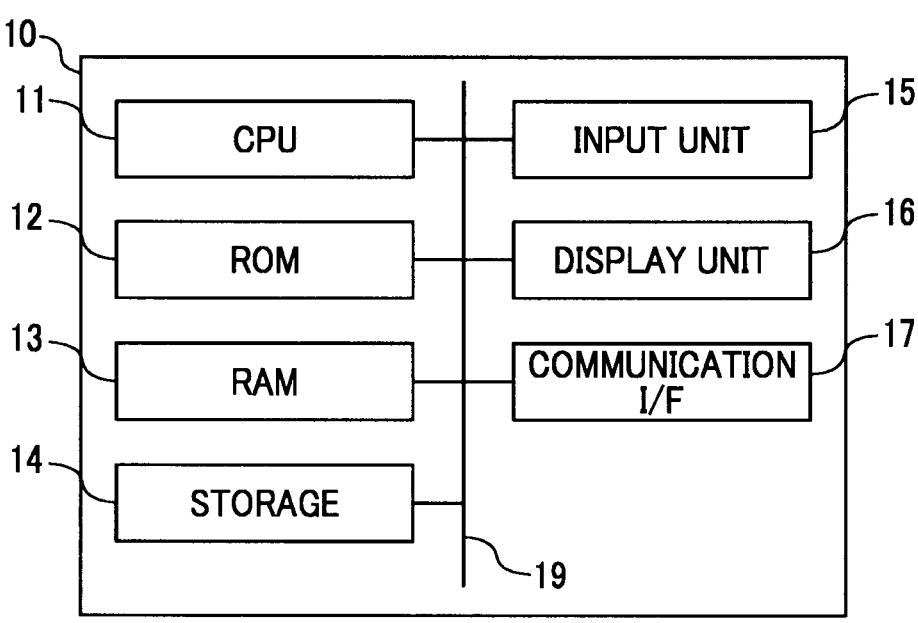
FIG. 2 is a block diagram showing a hardware configuration of an information processing apparatus according to the present exemplary embodiment.

FIG. 2 is a block diagram showing a hardware configuration of the information processing apparatus 10. The information processing apparatus 10 includes each configuration of a central processing unit (CPU) 11, a read only memory (ROM) 12, a random access memory (RAM) 13, a storage 14, an input unit 15, a display unit 16, and a communication interface (communication I/F) 17. Each configuration is connected to each other via a bus 19 so as to be communicable with each other.

The CPU 11 is a central arithmetic processing unit, executes various programs, and controls each unit. That is, the CPU 11 reads a program from the ROM 12 or the storage 14, and executes the program using the RAM 13 as a work area. The CPU 11 controls each configuration and performs various arithmetic processes according to the program recorded in the ROM 12 or the storage 14. In the present exemplary embodiment, the ROM 12 or the storage 14 stores an information processing program that controls a proxy operation.

The ROM 12 stores various programs and various data. The RAM 13 temporarily stores programs or data as the work area. The storage 14 is configured by a hard disk drive (HDD) or a solid state drive (SSD), and stores various programs including an operating system and various data.

The input unit 15 includes a pointing device, such as a mouse, and a keyboard, and is used to perform various inputs.

The display unit 16 is, for example, a liquid crystal display, and displays various types of information. The display unit 16 may function as the input unit 15 by adopting a touch panel system.

The communication interface 17 is an interface for communicating with another device such as a database. For example, standards such as Ethernet (registered trademark), FDDI, and Wi-Fi (registered trademark) are used.

Next, the operation of the information processing apparatus 10 will be described.

Figures 3, 4:
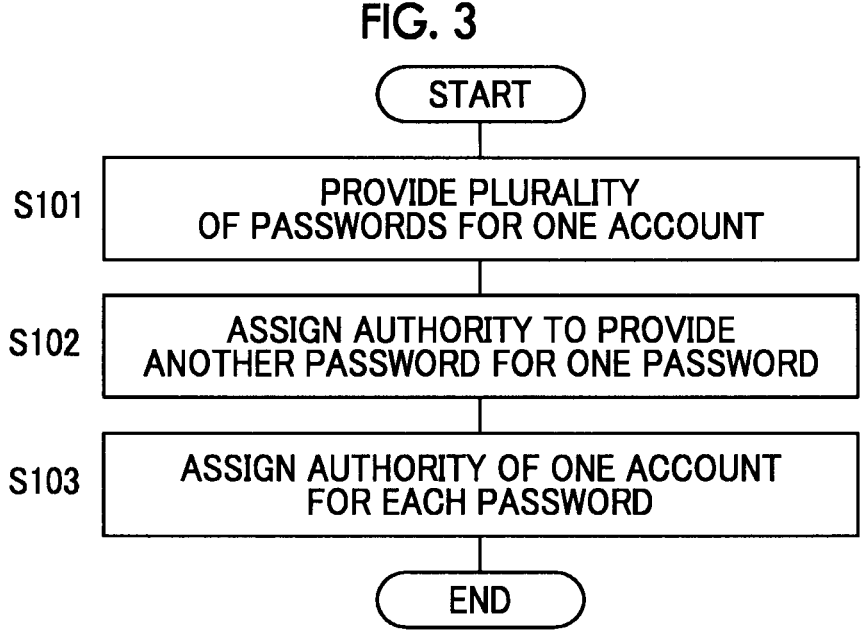
FIG. 3 is a flowchart showing a flow of a setting process of the information processing apparatus according to the present exemplary embodiment.
FIG. 4 is an example showing an account table of the information processing apparatus according to the present exemplary embodiment.

FIG. 3 is a flowchart showing a flow of a setting process by the information processing apparatus 10. The CPU 11 reads a setting program from the ROM 12 or the storage 14, expands the setting program into the RAM 13, and executes the setting program, thereby performing the setting process.

In step S101, the CPU 11 provides a plurality of passwords for one account. In the present disclosure, a password used by a requester U1 is set as one password, and a password used by an agent U2 is described as another password. The CPU 11 proceeds to step S102.

In step S102, the CPU 11 assigns an authority to provide another password for one password. In other words, in a case where the requester U1 logs in using one password, the requester U1 can create another password to be used by the agent U2. The CPU 11 proceeds to step S103.

In step S103, the CPU 11 assigns the authority of one account for each password. For example, the CPU 11 may assign a part or all of the authority assigned for one password to another password. The CPU 11 ends the setting process.

Here, FIG. 4 is an example showing an account table of the information processing apparatus 10 according to the present exemplary embodiment. The account table includes, for example, an account name item, a user password item, a user name item, an organization item, an agent name item, an agent password item, a proxy authority item, and a proxy deadline item. The information processing apparatus 10 creates the account table for each account that serves as a requester.

The account name item is an item for storing an account name. The account name is an identifier that identifies an account and is used for login. That is, the information processing apparatus 10 creates account names corresponding to the number of requesters U1.

The user password item is an item for storing one password used by the requester U1.

The user name item is an item for storing an identifier that identifies the requester U1.

The organization item is an item for storing an organization name to which the requester U1 belongs.

The agent name item is an item for storing an identifier that is set for each agent password and an identifier that is not used for login. That is, the agent name is an identifier associated with a password used by the agent U2 for login. In other words, the information processing apparatus 10 associates the identifier that is not used for login with each authentication unit.

The agent password item is an item for storing another password used by the agent U2.

The proxy authority item is an item for storing an operation that the agent U2 can act on behalf of. The information processing apparatus 10 may designate the operation that the agent U2 can act on behalf of in a functional unit or a job unit. In a case where the information processing apparatus 10 has a plurality of image forming apparatuses 20, the image forming apparatus 20 to which the agent U2 can login may be designated. For example, the information processing apparatus 10 may designate a storage destination of backed-up data for each agent U2.

The proxy deadline item is an item for storing a deadline that the agent U2 can act on behalf of.

The information processing apparatus 10 sets another password used by the agent for each account. In the account table shown in FIG. 4, one agent passwords is used, but the present disclosure is not limited thereto. That is, the information processing apparatus 10 may set a plurality of agent passwords for one account.

As described above, by performing processes from step S101 to step S103 described above, the CPU 11 provides a plurality of passwords for one account for logging into the image forming apparatus 20, permits login with one account regardless of which of the plurality of passwords is used, and assigns the authority of one account for each password.

Figure 5:
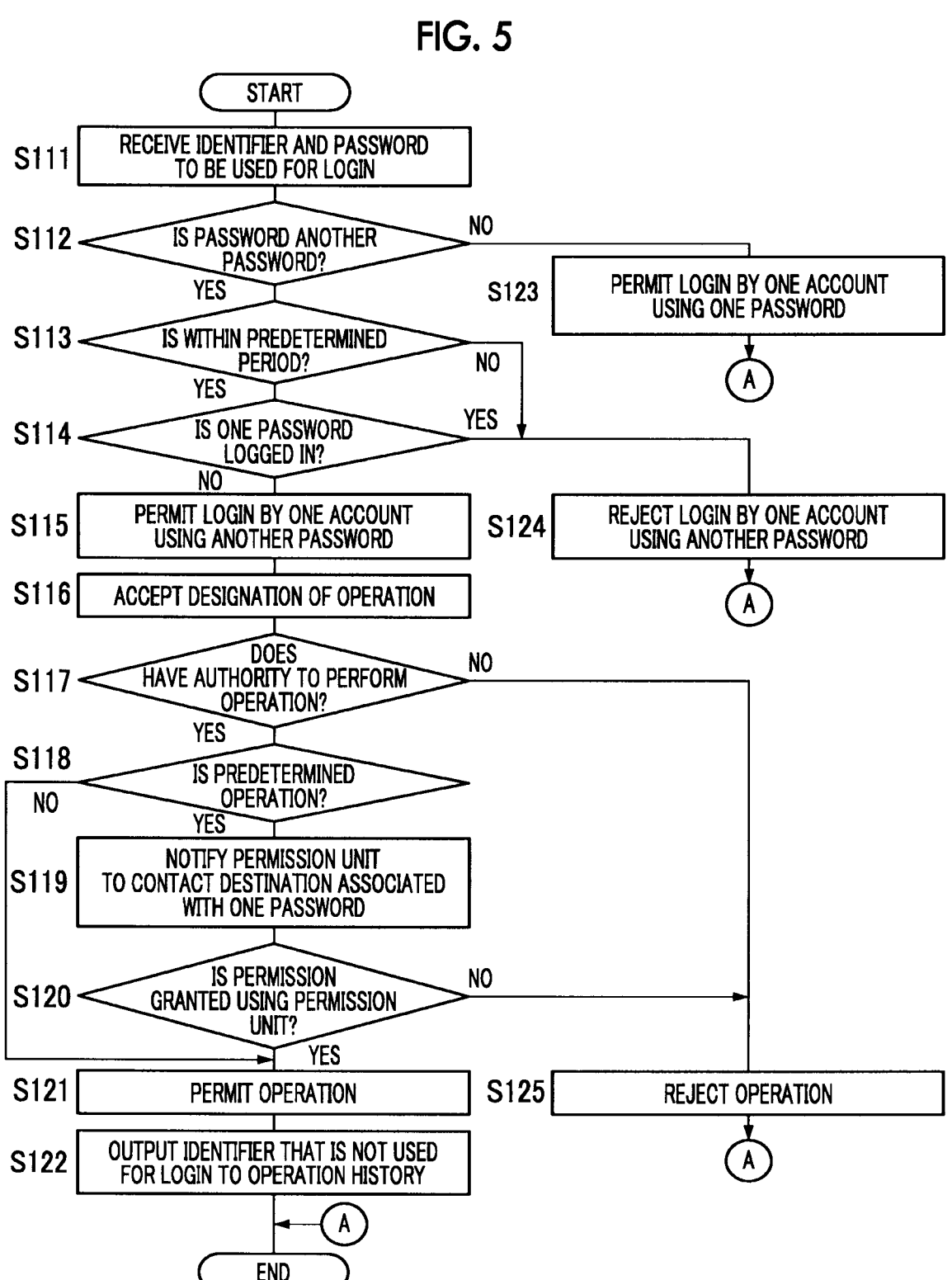
FIG. 5 is a flowchart showing a flow of a proxy process of the information processing apparatus according to the present exemplary embodiment.

FIG. 5 is a flowchart showing a flow of a proxy process by the information processing apparatus 10. The CPU 11 reads a proxy program from the ROM 12 or the storage 14, expands the proxy program into the RAM 13, and executes the proxy program, thereby performing the proxy process.

In step S111, the CPU 11 receives the identifier and the password used for login. The identifier used for login is, for example, the account name in the account table shown in FIG. 4 above. The CPU 11 proceeds to step S112.

In step S112, the CPU 11 determines whether or not the password is another password. In a case where it is determined that the password is the other password (YES in step S112), the CPU 11 proceeds to step S113. In a case where it is determined that the password is not the other password (step S112: NO), the CPU 11 proceeds to step S123. A case where the password is not the other password is a case where the password is one password.

In step S113, the CPU 11 determines whether or not a period is within a predetermined period. In a case where it is determined that the period is within the predetermined period (YES in step S113), the CPU 11 proceeds to step S114. In a case where it is determined that the period is not within the predetermined period (step S113: NO), the CPU 11 proceeds to step S124. The CPU 11 determines, for example, whether or not a current date and time exceeds a proxy deadline in the account table described in FIG. 8 above.

In step S114, the CPU 11 determines whether or not one password is logged in. In a case where it is determined that one password is not logged in (step S114: NO), the CPU 11 proceeds to step S115. In a case where it is determined that one password is logged in (YES in step S114), the CPU 11 proceeds to step S124.

In step S115, the CPU 11 permits login by one account using the other password. The CPU 11 proceeds to step S116.

In step S116, the CPU 11 accepts the designation of the operation. The CPU 11 proceeds to step S117.

In step S117, the CPU 11 determines whether or not to have an authority to perform the operation. In a case where it is determined to have the authority to perform the operation (YES in step S117), the CPU 11 proceeds to step S118. In a case where it is determined to have the authority to perform the operation (step S117: NO), the CPU 11 proceeds to step S125. The CPU 11 determines, for example, whether or not the operation is included in proxy authority in the account table described in FIG. 4 above.

In step S118, the CPU 11 determines whether or not the operation is a predetermined operation. In a case where it is determined that the operation is the predetermined operation (step S118: YES), the CPU 11 proceeds to step S119. In a case where it is determined that the operation is not the predetermined operation (step S118: NO), the CPU 11 proceeds to step S121. The predetermined operation includes, for example, backup and restore.

In step S119, the CPU 11 notifies a permission unit to a contact destination associated with one password. That is, the CPU 11 notifies the requester U1 that there is the predetermined operation and the permission unit thereof. The notification of the permission unit is, for example, a notification of a uniform resource locator (URL) of a site for selecting permission or rejection. The CPU 11 proceeds to step S120.

In step S120, the CPU 11 determines whether or not permission is granted using the permission unit. In a case where it is determined that the permission is granted using the permission unit (step S120: YES), the CPU 11 proceeds to step S121. In a case where it is determined that the permission is not granted using the permission unit (step S120: NO), the CPU 11 proceeds to step S125.

In step S121, the CPU 11 permits the operation. The CPU 11 proceeds to step S122.

In step S122, the CPU 11 outputs an identifier associated with the other password to operation history. That is, the CPU 11 outputs the identifier associated with the password used for login to the operation history. The identifier associated with the other password is, for example, the agent name in the account table shown in FIG. 4 above. For example, the CPU 11 writes an identifier in the operation history for each operation. The CPU 11 ends the proxy process.

In step S123, the CPU 11 permits login by one account using one password. The CPU 11 ends the proxy process.

In step S124, the CPU 11 rejects the login by one account by using the other password. The CPU 11 ends the proxy process.

In step S125, the CPU 11 rejects the operation. The CPU 11 ends the proxy process.

As described above, in a case where there is the predetermined operation, the CPU 11 provides a notification to the contact destination associated with one password by the processes in step S118 and step S119 described above.

Further, by the processes from step S119 to step S125 described above, in a case where permission is granted using the permission unit, the CPU 11 permits a predetermined operation using the other password.

Further, by the processes in step S114 and step S124 described above, in a case where one password is logged in, the CPU 11 does not permit login by the other password.

Modification Example

The information processing apparatus 10 of the first exemplary embodiment has been described above. However, the present disclosure is not limited to the above exemplary embodiment. Various improvements or modifications are possible.

The information processing apparatus 10 according to the present exemplary embodiment may have a form in which the information processing apparatus 10 and the image forming apparatus 20 are integrated. In other words, the information processing apparatus 10 may be an image forming apparatus. Further, as described above, the image forming apparatus 20 may be any apparatus which has a login function, and is not limited to the image forming apparatus.

In the information processing apparatus 10 according to the present exemplary embodiment, the authentication unit for the login is not limited to the password. That is, in the flowcharts of FIGS. 3 and 5, the information processing apparatus 10 may use, instead of the password, biometric authentication, a personal identification number (PIN) code, a one-time password, a secret question, or the like.

Similar to the process of step S119 in FIG. 5 above, the information processing apparatus 10 according to the present exemplary embodiment may notify the contact destination associated with one password in a case where there is login by another password.

The information processing apparatus 10 according to the present exemplary embodiment may output the identifier associated with the password used for login to login history similarly to the process in step S122 in FIG. 5 above.

The process can also be realized by a dedicated hardware circuit. In this case, the process may be executed by one hardware or may be executed by a plurality of hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, a program for operating the information processing apparatus 10 may be provided by a computer-readable recording medium, such as a universal serial bus (USB) memory, a flexible disk, or a compact disc read only memory (CD-ROM), or may be provided on line via a network such as the Internet. In this case, a program recorded on the computer-readable recording medium is usually transferred to and stored in a memory, a storage, or the like. Further, for example, the program may be provided as independent application software, or may be incorporated into software of each apparatus as a function of the information processing apparatus 10.

Supplementary Note

Hereinafter, although there is no particular limitation, preferred forms of the present disclosure will be described.

(((1)))

An information processing apparatus comprising:

a processor configured to:

provide a plurality of authentication units for one account for logging into a device;

permit login by the one account even using any of the plurality of authentication units; and assign authority of the one account to each of the authentication units.

(((2)))

The information processing apparatus according to (((1))), wherein the processor is configured to:

assign authority to provide another authentication unit to one authentication unit of the plurality of authentication units.

(((3)))

The information processing apparatus according to (((2))), wherein the processor is configured to:

assign a part or all of the authority assigned to the one authentication unit to the other authentication unit.

(((4)))

The information processing apparatus according to (((2))), wherein the processor is configured to:

provide a notification to a contact destination associated with the one authentication unit in a case where there is login by the other authentication unit or a predetermined operation.

(((5)))

The information processing apparatus according to (((4))), wherein the notification includes a notification of a permission unit for permitting the login by the other authentication unit or the predetermined operation, and the processor is configured to:

permit the login by the other authentication unit or the predetermined operation in a case where permission is granted by the permission unit.

(((6)))

The information processing apparatus according to any one of (((1))) to (((5))), wherein the processor is configured to:

associate an identifier that is not used for login with each of the authentication units, and output the identifier that is used for login and associated with the authentication unit to login history or operation history.

(((7)))

The information processing apparatus according to any one of (((1))) to (((6))), wherein the processor is configured to:

permit login by the one account using any of the plurality authentication units within a predetermined period for each authentication unit.

(((8)))

The information processing apparatus according to any one of (((1))) to (((7))), wherein the processor is configured to:

not permit login by another authentication unit in a case where one authentication unit of the plurality of authentication units is logged in.

(((9)))

An information processing program that causes a processor to:

provide a plurality of authentication units for one account for logging into a device;

permit login by the one account even using any of the plurality of authentication units; and assign authority of the one account to each of the authentication units.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

provide a plurality of authentication units for one account for logging into a device, wherein the plurality of authentication units comprise a designated authentication unit set for a requester using a first terminal;

in a case where the first terminal is logged into the device by the one account using the designated authentication unit, allow the first terminal to assign another authentication unit among the plurality of authentication units to an agent using a second terminal, and assign authority of the one account to the second terminal to perform a predetermined operation on the device; and permit the second terminal to log in by the one account even using the another authentication unit to perform the predetermined operation on the device.

2. The information processing apparatus according to claim 1, wherein the processor is configured to:

assign authority to provide the another authentication unit to one authentication unit of the plurality of authentication units.

3. The information processing apparatus according to claim 2, wherein the processor is configured to:

assign a part or all of the authority assigned to the one authentication unit to the another authentication unit.

4. The information processing apparatus according to claim 2, wherein the processor is configured to:

provide a notification to a contact destination associated with the one authentication unit in a case where there is login by the another authentication unit or the predetermined operation.

5. The information processing apparatus according to claim 4, wherein the notification includes a notification of a permission unit for permitting the login by the another authentication unit or the predetermined operation, and the processor is configured to:

permit the second terminal to log in by the another authentication unit or the predetermined operation in a case where permission is granted by the permission unit.

6. The information processing apparatus according to claim 1, wherein the processor is configured to:

associate an identifier that is not used for login with each of the authentication units, and output the identifier that is used for login and associated with the authentication unit to login history or operation history.

7. The information processing apparatus according to claim 1, wherein the processor is configured to:

permit the second terminal to log in by the one account using the plurality of authentication units within a predetermined period for each authentication unit.

8. The information processing apparatus according to claim 1, wherein the processor is configured to:

not permit the second terminal to log in by another authentication unit in a case where one authentication unit of the plurality of authentication units is logged in.

9. The information processing apparatus according to claim 1:

in response to an instruction to perform the predetermined operation on the device being received from the second terminal, control the device to perform the predetermined operation.

10. The information processing apparatus according to claim 1, wherein the plurality of authentication units are different passwords.

11. A non-transitory computer readable medium storing an information processing program that causes a processor to:

provide a plurality of authentication units for one account for logging into a device, wherein the plurality of authentication units comprise a designated authentication unit set for a requester using a first terminal;

in a case where the first terminal is logged into the device by the one account using the designated authentication unit, allow the first terminal to assign another authentication unit among the plurality of authentication units to an agent using a second terminal, and assign authority of the one account to the second terminal to perform a predetermined operation on the device; and permit the second terminal to log in by the one account even using the another authentication unit to perform the predetermined operation on the device.

12. An information processing method comprising:

providing a plurality of authentication units for one account for logging into a device, wherein the plurality of authentication units comprise a designated authentication unit set for a requester using a first terminal;

in a case where the first terminal is logged into the device by the one account using the designated authentication unit, allowing the first terminal to assign another authentication unit among the plurality of authentication units to an agent using a second terminal, and assigning authority of the one account to the second terminal to perform a predetermined operation on the device; and permitting the second terminal to log in by the one account even using the another authentication unit to perform the predetermined operation on the device.

\* \* \* \* \*